US008931341B2

(12) United States Patent
Klopping et al.

(10) Patent No.: US 8,931,341 B2
(45) Date of Patent: Jan. 13, 2015

(54) TEST MASS AND METHOD FOR INTERFEROMETRIC GRAVITY CHARACTERISTIC MEASUREMENT

(75) Inventors: Fred J. Klopping, Longmont, CO (US); Ryan M. Billson, Loveland, CO (US); Timothy M. Niebauer, Boulder, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 206 days.

(21) Appl. No.: 13/564,548

(22) Filed: Aug. 1, 2012

(65) Prior Publication Data

US 2014/0026655 A1    Jan. 30, 2014

Related U.S. Application Data

(63) Continuation-in-part of application No. 13/558,138, filed on Jul. 25, 2012.

(51) Int. Cl.
*G01V 7/14* (2006.01)

(52) U.S. Cl.
USPC ..................................... 73/382 R; 73/382 G (58) Field of Classification Search
USPC ............................................. 73/382 G, 382 R
See application file for complete search history.

(56) References Cited

U.S. PATENT DOCUMENTS

| 3,688,584 | A | * | 9/1972 | Stone et al. | 73/382 R |
|---|---|---|---|---|---|
| 3,693,451 | A | | 9/1972 | Dunlap et al. | |
| 3,704,626 | A | | 12/1972 | Stone | |
| 3,727,462 | A | * | 4/1973 | Stone et al. | 73/382 R |
| 3,865,467 | A | * | 2/1975 | Von Thuna | 359/529 |
| 5,351,122 | A | * | 9/1994 | Niebauer et al. | 356/496 |
| 5,892,151 | A | * | 4/1999 | Niebauer et al. | 73/382 R |
| 6,082,194 | A | * | 7/2000 | Gladwin | 73/382 G |
| 6,298,722 | B1 | * | 10/2001 | Faller et al. | 73/382 R |
| 6,325,172 | B1 | * | 12/2001 | Langridge et al. | 181/122 |
| 7,469,585 | B2 | * | 12/2008 | Meyer | 73/382 R |
| 2003/0081218 | A1 | | 5/2003 | Orban | |
| 2008/0034855 | A1 | | 2/2008 | Peeters et al. | |
| 2009/0219546 | A1 | * | 9/2009 | Benischek | 356/482 |
| 2011/0046913 | A1 | * | 2/2011 | Hilby | 702/141 |

(Continued)

FOREIGN PATENT DOCUMENTS

| CN | 102323624 A | 1/2012 |
|---|---|---|
| EP | 2348338 A1 | 7/2011 |

(Continued)

OTHER PUBLICATIONS

PCT International Search Report with attached Written Opinion of the International Searching Authority for International Application No. PCT/US2013/050800, dated Dec. 10, 2013, 13 pages.

(Continued)

*Primary Examiner* — Helen Kwok
(74) *Attorney, Agent, or Firm* — John R. Ley (57) ABSTRACT

A test mass used for light beam interferometric gravity characteristic measurement has a center of mass located equidistant and colinear with optical center points of two oppositely reflecting retroreflectors. Rotation of the test mass about its center of mass during freefall changes the path length of the oppositely reflected light beams by equal amounts, thereby achieving common mode cancellation of the effects of test mass rotation when the two reflected light beams are interferometrically combined.

17 Claims, 6 Drawing Sheets

(56) References Cited

U.S. PATENT DOCUMENTS

2013/0205894 A1* 8/2013 Rothleitner ............... 73/382 R
2014/0026654 A1* 1/2014 Klopping et al. ........... 73/382 G

FOREIGN PATENT DOCUMENTS

FR 2089057 A5 1/1972
WO 2011/086020 A1 7/2011

OTHER PUBLICATIONS

PCT International Search Report with attached Written Opinion of the International Searching Authority for International Application No. PCT/US2013/050819, dated Dec. 3, 2013, 14 pages.

Christian Rothleitner, "Ultra-high Precision, Absolute, Earth Gravity Measurements," dissertation, 2008, pp. 1-160, University Erlangen-Nuremberg, Berlin, Germany.

C. Rothleitner et al., "A method for adjusting the centre of mass of a freely falling body in absolute gravimetry," 2007, pp. 234-241, IOP Publishing, Metrologia, Bristol, Great Britain.

A. Vitouchkine et al., "Short Communication—A direct and sensitive method for positioning the centre of mass of a dropping object at the optical centre of the enclosed corner cube in ballistic absolute gravimeters," 2004, pp. L19-L21, Institute of Physics Publishing, Metrologia, Bristol, Great Britain.

T. Niebauer et al., "A new generation of absolute gravimeters," 1995, pp. 159-180, Metrologia.

* cited by examiner

TEST MASS AND METHOD FOR INTERFEROMETRIC GRAVITY CHARACTERISTIC MEASUREMENT

CROSS REFERENCE TO RELATED INVENTION

This invention is a continuation in part of U.S. patent application Ser. No. 13/558,138, titled "Interferometric Gravity Gradiometer Apparatus and Method," filed Jul. 25, 2012 by the inventors hereof, and assigned to the assignee hereof. The subject matter of U.S. patent application Ser. No. 13/558,138 is incorporated herein by this reference.

FIELD OF THE INVENTION

This invention relates to a new and improved test mass and method for use in light beam interferometry gravity characteristic measurement, to commonly cancel errors in the gravity characteristic measurement caused by anomalous rotation or tilting of the test mass during freefall when measuring a characteristic of gravity.

BACKGROUND OF THE INVENTION

Gravity is the force of inherent natural attraction between two massive bodies. The magnitude of the gravitational force is directly related to the mass of the bodies and is inversely related to the square of the distance between centers of mass of the two attracted bodies.

Gravity is measured as acceleration, g, usually as a vertical vector component. The freefall acceleration, g, of an object near the surface of the earth is given to a first approximation by the gravitational attraction of a point with the mass of the entire earth, $M_e$, located at the center of the earth, a distance, $R_e$, from the surface of the earth. This nominal gravity value, $g=G \times M_e/R_e^2$, is about 9.8 m/s$^2$. Thus, the freefall acceleration due to gravity near the earth's surface of an object having a small mass compared to the mass of the earth is about 9.8 m/s$^2$. The common unit of measurement for gravity is the "Galileo" (Gal), which is a unit of acceleration defined as 1 cm/s$^2$. One Gal generally approximates $\frac{1}{1000}$ ($10^{-3}$) of the force of gravity at the earth's surface. An instrument used to measure gravity is called a "gravimeter."

The most accurate gravimeters are absolute gravimeters. Interferometric absolute gravimeters usually use a freely falling test mass and a laser or single-frequency light beam which reflects from the freely falling test mass. The reflected light beam is combined with a reference light beam to develop interference fringes. Interference fringes are instances where the amplitude or intensity of the reflected and reference light beams add together to create increased intensity, separated by instances where the two beams cancel or create diminished intensity.

Fringes occur on a periodic basis depending upon the change in the optical path length of the reflected beam relative to the optical path length of the reference beam. One fringe occurs whenever the optical path difference between the reflected and reference beams changes by the wavelength of the light in the two beams. When a test mass that is part of the beam path falls freely, the freefall movement of the test mass typically changes the path length by twice the amount of movement because both the entry and exit of the beam path are changed. In this circumstance, a fringe typically occurs when the test mass moves by one-half of a wavelength. The fringes taken together as a set comprise a record of the distance that the freely falling test mass moves.

Because the path length of the reflected beam changes as it is reflected from the freely falling test mass, and because the freefall movement of the test mass is established by gravity, the occurrence and timing of the resulting interference fringes defines the characteristic of gravity. The use of optical fringe interferometry to measure gravity characteristics is well-known. An example of an interferometric absolute gravimeter is described in U.S. Pat. No. 5,351,122.

In addition to measuring gravity, light beam interferometry has also been applied to measure a gradient of gravity. A gradient of gravity is the rate at which gravity changes in a certain direction and over a certain distance. A gravity gradient is therefore the change or first derivative of the gravity value over distance. An instrument used to measure a gradient of gravity is called a "gradiometer."

Gravity gradients from subsurface density anomalies, such as a pool of liquid petroleum encased within an earth formation, narrow seams or "tubes" of high density geological materials such as diamonds or cobalt, or voids in a geographical formation caused by a tunnel or cavern, are most measurable within a relatively short near-field distance, typically within a few hundred meters. Such near-field density anomalies affect the local value of gravity, g, at a level of about 1 part per million ($\frac{1}{10^6}$), and in some cases 1 part per billion ($\frac{1}{10^9}$). The large background of the earth's gravity requires that any direct gravity measurement to detect such subsurface anomalies have a very large dynamic range of parts per billion, otherwise direct gravity measurements will not be useful for locating and detecting such subsurface density anomalies. It is difficult to make gravimeters with such levels of extremely high precision, so gradiometers are used to cancel the large effect of the earth's gravity while preserving the ability to detect nearby density anomalies. However, gravity measurements using gravimeters are required to detect and evaluate medium-field and far-field density anomalies.

The vertical gravity gradient of the earth is relatively much smaller in comparison to the vertical gravity gradient caused by nearby mass or density anomalies. The vertical gravity gradient is typically measured in terms of a unit called the Eotvos unit, E, given by $10^{-9}/s^2$. The vertical gravity gradient of the entire earth is typically about 3000E. Typical nearby mass anomalies can affect the vertical gravity gradient at a level of about 1E or more. Thus, the contrast of the vertical gravity gradient caused by nearby mass anomalies to the earth's vertical gravity gradient is about 300,000 ($3 \times 10^5$) times larger than for the gravity value itself. This means that a vertical gradiometer can have $3 \times 10^5$ times less precision than a gravimeter and still be used effectively to detect or locate nearby mass or density anomalies. However, even though effective with less precision than a gravimeter, a gradiometer is still subject to erroneous measurements from the occurrence of anomalous fringes.

Each gravimeter and gradiometer which uses a freely falling test mass is subject to naturally-occurring and man-made vibrations and other physical perturbations. These vibrations and perturbations cause minute changes in the path length of the reflected and reference light beams, causing interference fringes which are not related to the gravity characteristic measured but instead are related to the noise arising from the aberrant vibrations and other physical perturbations. Such anomalous interference fringes reduce the accuracy of the measurement of the gravity characteristic and enhance the potential for errors. These types of errors are not typically subject to common mode rejection because the errors uniquely affect some singular aspect of the light path or the gradiometer or gravimeter. The inability to achieve effective common mode rejection makes the measurement of a gravity characteristic error-prone, particularly in vibration-prone or perturbation-prone environments.

One of several possible causes of inaccuracies in the measurements from interferometric gravity characteristic devices is the random and unintended rotation or tilting of the test mass during freefall. The test mass is prone to rotate during freefall due to vibrations or perturbations of the gravimeter or gradiometer at the moment that the test mass is released or launched for freefall. The rotation of the test mass changes the length of the light beam path and that change is unrelated to the influence of gravity on the test mass. The interference fringes therefore distort or mask the true influence of gravity on the freefalling test mass, and this distortion diminishes the accuracy of the measured gravity characteristic. Even a very slight amount of angular rotation or tilting of the test mass during freefall is enough to cause a significant error in measurement.

Prior known attempts at avoiding angular rotation or tilting of the test mass during freefall have focused principally on attempting to mechanically isolate the test mass from the adverse influences of external vibrations and perturbations, and on attempting to mechanically release the test mass for freefall without inducing tilting or angular rotation. However, such mechanical measures have not proved entirely satisfactory in eliminating rotation or tilting of the test mass during freefall, and consequently anomalous interference fringes have occurred and degraded the quality of the gravity characteristic measurement.

SUMMARY OF THE INVENTION

The present invention ameliorates or eliminates inaccuracies in gravity measurements caused by rotation or tilting of a freely falling test mass upon which one or more light beams reflect, in a light beam interferometric gravity measurement apparatus. Characteristics of the test mass cause the two reflected light beams to change path lengths by equal amounts when the test mass rotates or tilts, thereby preserving the relative equality in length of the light beam paths and canceling the effects of rotation or tilting by common mode rejection when the two light beams are combined interferometrically to measure the gravity characteristic. Preserving the equality in the light beam paths eliminates or cancels anomalous and distorting interference fringes resulting from test mass rotation which would otherwise contribute to inaccuracy of measurement. The present invention contributes significantly to enhancing the dynamic range of accurate measurement of gravity in gradiometers and the dynamic range of accurate measurement of gravity gradients in gradiometers, by eliminating some of the degrading background effects.

These and other benefits and improvements are achieved by a test mass having a center of mass and which is adapted to freefall under the influence of gravity in an interferometric light beam gravity characteristic measurement apparatus. The test mass comprises first and second retroreflectors. The first retroreflector has an optical center point and is operative to reflect a first incident light beam as a first reflected light beam. The second retroreflector has an optical center point and is operative to reflect a second incident light beam as a second reflected light beam. The first and second retroreflectors are retained with the optical center points equidistant from the center of mass, with the optical center points and the center of mass co-linear with respect to each other, and with the first and second retroreflectors oriented to reflect the first and second reflected light beams parallel to one another and in opposite directions from one another.

Additional subsidiary features relating to the test mass include reflecting the reflected light beams parallel to the incident light beams, weighting a support structure to adjust the position of the center of mass of the test mass with respect to the optical center points of the first and second reflectors, retaining the first and second retroreflectors in separate housing elements and moving the housing elements relative to each other to position the optical center points of the first and second retroreflectors relative to the center of mass of the test mass, incorporating pass-through openings in the housing elements to allow the light beams to impinge upon and reflect from the retroreflectors, using open retroreflectors which are defined by three mutually perpendicular reflective wall surfaces which would intersect at a corner, and positioning the corners coincidentally with the co-linear relationship of the optical center points and the center of mass.

The above described and other benefits and improvements are also be achieved in a method of using the test mass in an interferometric light beam gravity characteristic measuring apparatus, such as a gravimeter or a gradiometer. The method involves freefalling the test mass, rotating the test mass while freefalling, directing first and second light beams into first and second beam arms with the light beams impinging upon and reflecting from first and second retroreflectors while the test mass is freefalling, changing the length of the first and second beam arms by an amount related to the freefall movement of the test mass, changing the length of the first and second beam arms by an amount related to rotation of the test mass, combining the first and second reflected light beams into a combined light beam to create interference fringes in the combined light beam, canceling interference fringes in the combined light beam arising from the first and second reflected light beams caused by rotation of the test mass, and determining the gravity characteristic from the interference fringes of the combined light beam remaining after cancellation of the interference fringes caused by rotation of the test mass.

The above described and other benefits and improvements are also achieved in a method of eliminating adverse effects of rotation of a freely falling test mass when measuring a gravity characteristic by light beam interferometry. The method comprises reflecting first and second light beams from the test mass while in free fall, combining the first and second reflected light beams interferometrically to create fringes which characterize the gravity characteristic to be measured, eliminating from the combined light beams aberrant fringes resulting from rotation of the test mass during freefall, and determining the measured gravity characteristic from the fringes of the combined first and second light beams after eliminating the aberrant fringes.

Additional subsidiary features of this method, which relate to eliminating the aberrant fringes, involve impinging and reflecting the first and second light beams from first and second retroreflectors of the test mass during freefall of the test mass and causing the path lengths of each first and second light beam to change equally when impinging and reflecting from the first and second retroreflectors during rotation of the test mass during freefall, rotating the test mass about a center of mass point during freefall and using first and second retroreflectors which each have an optical center point that is located equidistantly from and co-linearly with the center of mass point, and reflecting the first and second reflected light beam from the first and second retroreflectors parallel to the first and second incident light beam on the first and second retroreflectors.

A more complete appreciation of the present invention and its scope may be obtained from the accompanying drawings, which are briefly summarized below, from the following detailed description of a presently preferred embodiment of the invention, and from the appended claims.

DETAILED DESCRIPTION

The new and improved test mass and method of the present invention is used in a light beam interferometric gravity characteristic measurement apparatus and method. Examples of such light beam interferometric gravity characteristic measurement apparatus are a light beam interferometric gradiometer 20, shown in FIGS. 1 and 3, and a light beam interferometric gravimeter 200, shown in FIG. 7. The gradiometer 20 includes two test masses 22 and 24 (FIGS. 1 and 3), both of which incorporate the present invention, and the gravimeter 200 includes a single test mass 202 (FIG. 7), which also incorporates the present invention. The test masses 22, 24 and 202 are essentially identical from a functional and structural standpoint. In general, the new and improved test mass of the present invention is useful in any type of light beam interferometric measurement apparatus or method which uses a freely falling test mass in which it is desired to substantially eliminate the anomalous interference fringes created by inadvertent rotation or tilting of the test mass during freefall and from which light beams are oppositely reflected from the freely falling test mass during use.

Figure 1:
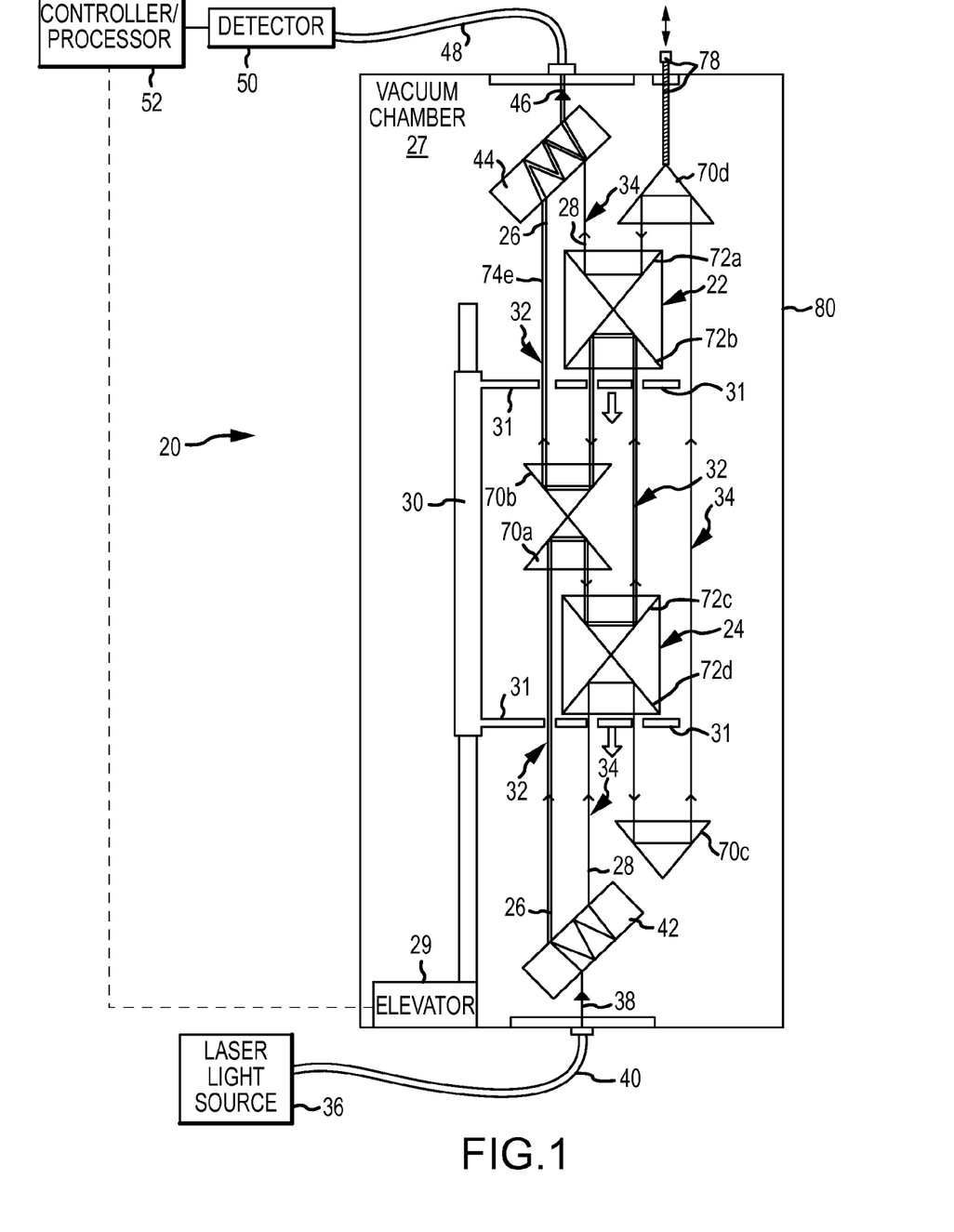
FIG. 1 is a generalized block, schematic and optical path diagram of a light beam interferometric gradiometer which includes two test masses, each of which incorporates the present invention.

The gravity gradiometer 20, shown in FIG. 1, is used to measure a gradient of gravity. More details about the gradiometer 20 are described in the above-reference to U.S. patent application Ser. No. 13/558,138. In general, however, the gravity gradiometer 20 measures the relative difference in gravity experienced by two test masses 22 and 24 which are released to fall freely and simultaneously only under the influence of gravity. The force of gravity acting on the lower test mass 24 is usually very slightly greater than the force of gravity acting on the upper test mass 22, since the lower test mass 24 is closer to the center of the earth's mass and therefore the lower test mass 24 experiences a slightly greater gravitational force.

The slightly greater gravity on the lower test mass 24 causes it to have a slightly greater downward acceleration compared to the downward acceleration of the upper test mass 22 during simultaneous freefall. The slightly greater acceleration of the lower test mass 24 causes the lower test mass 24 to increase its downward velocity slightly more than the downward velocity of the upper test mass 22 increases during freefall, thereby causing a slight increased physical separation between the two test masses 22 and 24 at the end of their simultaneous freefall compared to the separation of the test masses 22 and 24 at the beginning of their simultaneous freefall. An elevator 29, an elevator frame 30 and support devices 31 support the test masses 22 and 24, release or launch the test masses 22 and 24 for freefall solely under the influence of gravity, and catch the test masses 22 and 24 at the end of their simultaneous freefall.

Two light beams 26 and 28 impinge upon and reflect from both of the test masses 22 and 24 while they fall freely within a vacuum chamber 27. The light beams 26 and 28 traverse the interior of the vacuum chamber 27 over optical paths referred to herein as beam arms 32 and 34, respectively. The beam arms 32 and 34 are oriented to cause the light beams 26 and 28 to impinge on and reflect from both test masses 22 and 24. The slightly different effects of gravity on the test masses 22 and 24 during their simultaneous freefall change the lengths of the beam arms 32 and 34.

The light beams 26 and 28 enter the beam arms 32 and 34 having essentially the same frequency characteristics, since the light beams 26 and 28 have been derived from a single constant-frequency light source 36, such as a laser. A single input light beam 38 from the light source 36 is conducted through an optical fiber 40 to a beam splitter 42, which creates the two light beams 26 and 28. As an alternative to conducting the input light beam 38 through the optical fiber 40, mirrors could be used or the optical fiber 40 could be eliminated altogether by directly connecting the light source 36 to a housing 80 of the gradiometer 20 and directly injecting the light beam 38 into the gradiometer 20.

When the light beams 26 and 28 pass through the beam arms 32 and 34 and interact with both freely falling test masses 22 and 24, the increasing physical separation of the two test masses during simultaneous freefall creates a changing relative phase relationship of the reflected light beams 26 and 28 in the beam arms 32 and 34, because the beam arms 32 and 34 change length during simultaneous freefall of the test masses 22 and 24. After passing through the beam arms 32 and 34, the light beams 26 and 28 are combined in a beam combiner 44 as an output light beam 46. Combining the light beams 26 and 28 with their relatively changing phase relationships into the single output light beam 46 creates well known optical interference fringes. The interference fringes characterize the change in physical separation of the test masses during simultaneous freefall, as well as the amount and distance of movement over time, and that information correlates to the gradient of gravity.

An optical fiber 48 conducts the output light beam 46 to a conventional detector 50. The detector 50 generates signals which correspond to characteristics of the output light beam 46 including the interference fringes created by combining the light beams 26 and 28. A controller/processor 52 responds to signals from the detector 50 which represent the interference fringes and the timing of those fringes to determine the gradient of gravity, using known interferometric analysis and processing techniques, and from the known distance which separates the test masses 22 and 24.

The optical geometry and components of the beam arms 32 and 34 include four conventional open corner cube retroreflectors 70a-70d positioned within the vacuum chamber 27. The retroreflectors 70a, 70b and 70c are fixed in position, and the retroreflector 70d is adjustable in position. The test masses 22 and 24 each include upward facing open retroreflectors 72a and 72c and downward facing open retroreflectors 72b and 72d, respectively. The upward facing retroreflectors 72a and 72c face in the direction opposite from the direction that the test masses 22 and 24 freefall, and the downward facing retroreflectors 72b and 72d face in the direction that the test masses freefall. The retroreflectors 72a, 72b and 72c, 72d are firmly retained and supported as a part of the test masses 22 and 24, respectively.

In the optical geometry arrangement shown in FIG. 1, the light beams 26 and 28 each reflect from one upward facing retroreflector of one test mass and from one downward facing retroreflector of the other test mass. Specifically, the light beam 26 reflects from the upward facing retroreflector 72c of lower test mass 24 and the downward facing retroreflector 72b of the upper test mass 22, and the other light beam 28 reflects from the downward facing retroreflector 72d of the lower test mass 24 and the upward facing retroreflector 72a of the upper test mass 22.

Figure 3:
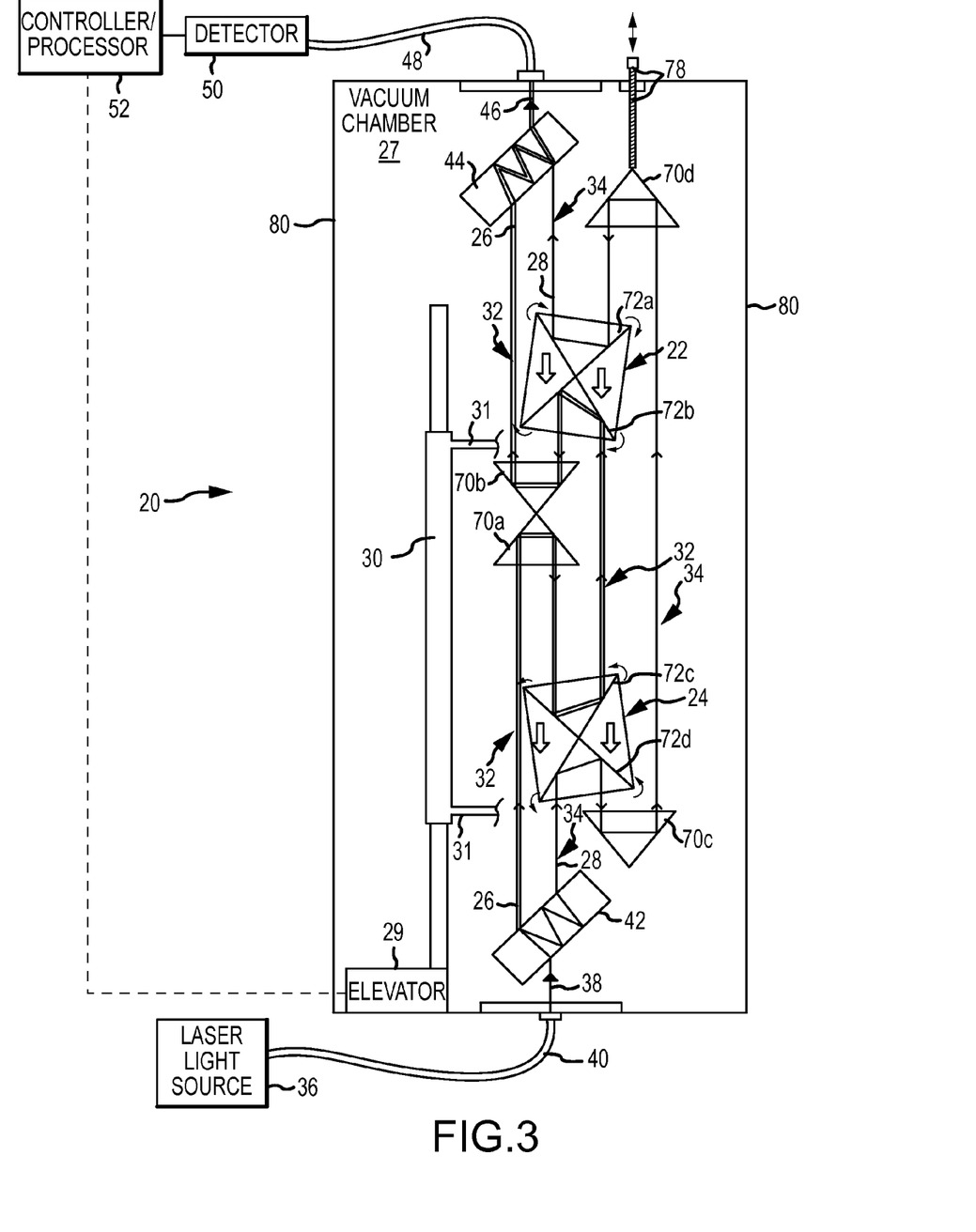
FIG. 3 is a diagram similar to FIG. 1, showing rotation of the two test masses during simultaneous freefall.

The length of the beam arms 32 and 34 is equal at one point during the simultaneous freefall of the test masses 22 and 24. The beam arms 32 and 34 are calibrated to have equal lengths at the point by adjusting the vertical position of the retroreflector 70d in the beam arm 34. The position of the retroreflector 70d is adjusted by manipulation of an adjustment device, such as a micrometer screw 78 as shown in FIG. 3, which extends through a housing 80 that defines the vacuum chamber 27. Adjusting the vertical position of the retroreflector 70d changes the length of the beam arm segments from the retroreflectors 70c and 70d and between the retroreflectors 70d and 72a, thereby changing the entire length of the beam arm 34.

The change in length of the beam arms 32 and 34 during freefall of the test masses 22 and 24 occurs equally and oppositely in each beam arm, i.e. the beam arm 32 increases in length while the beam arm 34 decreases in length, or vice versa. The change in length of the beam arms from the equality point is due only to the slightly different influence of gravity on each test mass, which causes a slightly different acceleration of each test mass, and any initial relative velocity difference that might be imposed upon the two test masses at the commencement of simultaneous freefall, as is discussed in greater detail in the above-referenced U.S. patent application Ser. No. 13/558,138. If both test masses 22 and 24 were subject to the same force of gravity and no initial velocity difference was imparted to the test masses, the beam arms 32 and 34 would remain equal in length throughout the simultaneous freefall. When the beam arms 32 and 34 undergo respectively different changes in length, the light beam in one beam arm 32 or 34 travels a different distance than the light beam travels in the other beam arm 34 or 32, resulting in relative phase changes which cause the interference fringes that are detected and processed to determine the characteristic of gravity measured.

The beam arms 32 and 34 within the vacuum chamber 27 are inherently parallel to one another, despite the movement of the test masses 22 and 24. If the beam arms 32 and 34 were not parallel to one another, the non-parallel deviation of one of the beam arms would cause it to have a different length compared to the other beam arm. Such a difference in path length would cause the light beam in one beam arm to travel a different distance than the light travels in the other beam arm, resulting in relative phase changes between the light beams 26 and 28. Such resulting phase shifts from unequal beam arm lengths would create erroneous interference fringes that would lead to errors in determining the actual gradient or other characteristic of gravity being measured.

The use of a parallel surface beam splitter 42 and a parallel surface beam combiner 44 contributes to the parallelism in the beam arms 32 and 34. An inherent characteristic of the parallel surfaces of the beam splitter 42 is that the two light beams 26 and 28 are emitted in a parallel relationship. Furthermore, the two light beams 26 and 28 extend in a parallel relationship with the input light beam 38. A similar situation exists with respect to the beam combiner 44, since the beam combiner 44 is a beam splitter used for the opposite purpose. The optical characteristics of the beam combiner 44 are the same as the beam splitter 42, causing parallel light beams 26 and 28 from the beam arms 32 and 34 to be combined in the single output beam 46 while preserving the relative phase relationship of the light beams 26 and 28. The beam combiner 44 emits the output signal 46 in parallel relationship to the light beams 26 and 28 delivered from the beam arms 32 and 34.

Changes in direction of the light beams 26 and 28 within the vacuum chamber 27 are achieved only by the retroreflectors 70a-70d and 72a-72d. Use of the retroreflectors to change the direction of the light beams ensures parallelism in the beam arms 32 and 34, thereby maintaining equal path lengths, as is understood from the following discussion of a single conventional open retroreflector 75 shown in FIGS. 2A-2C. The retroreflector 75 exemplifies the characteristics of each stationary retroreflector within each gravity measuring apparatus, and each retroreflector connected to a test mass which incorporates the present invention.

Figure 2A:
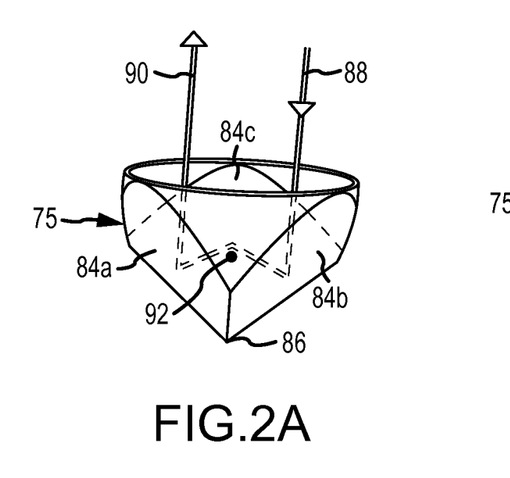
FIGS. 2A, 2B and 2C are perspective views of a conventional open corner cube retroreflector of a type used in the test masses shown in FIG. 1, each showing an incident light beam and a reflected light beam.

As shown in FIG. 2A, the retroreflector 75 has three mutually perpendicular reflective wall surfaces 84a-84c. The reflective wall surfaces 84a-84c intersect one another perpendicularly and define a corner 86 which faces in the direction of light beam impingement and away from the direction of light beam reflection. The wall surfaces 84a-84c are coated with a reflective material to cause light impinging on the wall surfaces 84a-84c to reflect from those surfaces. Alternatively, the wall surfaces 84a-84c may be formed of reflective mirror material, such as a polished metallic surface. The reflective wall surfaces 84a-84c are held in a connected and mutually perpendicular relationship by an adhesive or other structural elements of each retroreflector 75.

The retroreflector 75 is regarded as open, because an incident light beam 88 passes through the environment within the vacuum chamber 27 while it reflects off of the reflective wall surfaces 84a-84c and exits the retroreflector 75 as a reflected light beam 90. The mutually perpendicular angular relationship of the reflective wall surfaces 84a-84c creates an optical characteristic in which the reflected light beam 90 always reflects from the retroreflector parallel to the incident light beam 88. This parallel relationship is maintained through a wide operative range of angles of the incident light beam 88. Unlike a mirror, the retroreflector 75 therefore reflects light back in a direction parallel to the incident light, regardless of the angle of incidence of the light beam 88 within the operative range of angles. This parallel reflection characteristic causes the light beams in the beam arm segments between the retroreflectors 70a-70d and 72a-72d to remain parallel with respect to one another and maintain the substantially equal path lengths within the vacuum chamber 27 of the gradiometer 20 (FIG. 1).

Conventional retroreflectors can also be of the closed variety. A closed retroreflector is constructed of a body of solid glass or other high-grade transparent optical material. The three mutually perpendicular reflective wall surfaces are machined or otherwise formed on the body of the retroreflector. The reflective wall surfaces intersect one another mutually perpendicularly. The reflective wall surfaces are coated with a reflective material to reflect light impinging on the wall surfaces. An incident light beam passes through the body of the closed retroreflector while reflecting from the three mutually perpendicular reflective wall surfaces and exits the body of the retroreflector as the reflected beam that projects parallel to the incident beam.

While a closed retroreflector can be used in place of each open retroreflector described herein, the closed retroreflector has the effect of changing the speed of the light beam passing through the changed medium of the optical body of the retroreflector. Using open retroreflectors causes the speed of light to remain constant throughout the entire beam arms 32 and 34, because the light beams do not pass through an optical body, thereby avoiding any phase or path length differences that might be created by conducting the light beams through a different medium.

Figure 2B:
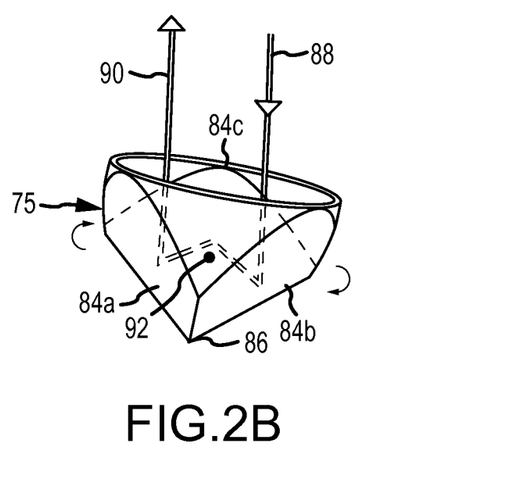

The test masses 22 and 24 are subject to random rotation or tilting while freefalling due to random perturbations or vibrations of the housing 80 and/or the support devices 31 (FIG. 1), at the instant(s) when the test masses 22 and 24 are released into freefall. Such random perturbations may rotate both test masses in the same or different direction, or rotate one test mass but not the other, or rotate one test mass to a different relative degree than the other test mass is rotated. Unintended random rotation of the test masses during freefall does not change the lengths of the beam arms 32 and 34, because the retroreflectors 72a-72d and their orientation on the test masses 22 and 24 avoid the spurious effects from unintended random rotation of the test masses during freefall. Rotation of the test masses is illustrated in FIG. 3, where the upper test mass 22 is shown rotated clockwise and the lower test mass 24 is shown rotated counterclockwise. In the exemplary retroreflector 75 shown in FIGS. 2A, 2B and 2C, an optical center point 92 is equidistant from each of the reflective wall surfaces 84a-84c. When the retroreflector 75 is rotated about the optical center point 92, the path length of the reflected light beam remains constant. Thus, when the retroreflector 75 is rotated about the optical center point 92, the light beam path length within the retroreflector remains constant regardless of the angle of the incident light beam 88, within a range of working angles. FIG. 2B illustrates the situation where the retroreflector 75 has been rotated slightly around the optical center point 92, but the length of the light path within the retroreflector 75 remains the same as the light path shown in FIG. 2A.

Figure 2C:
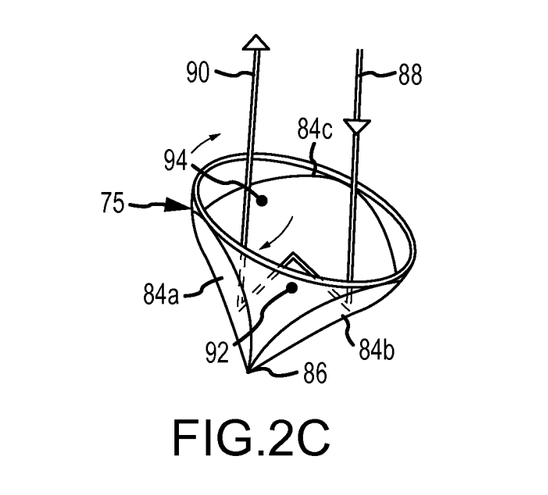

When the retroreflector 75 is rotated about a point 94, shown in FIG. 2C, which is not coincident with the optical center point 92, the length of the light path within the retroreflector 75 changes in length, and that change in length is related to the amount of angular rotation of the point 94 relative to the optical center point 92. For similar changes in angular rotation about points which have the same relative relationship to the optical center point 92, the change in length of the light path within the retroreflector 75 is the same.

Figure 4A:
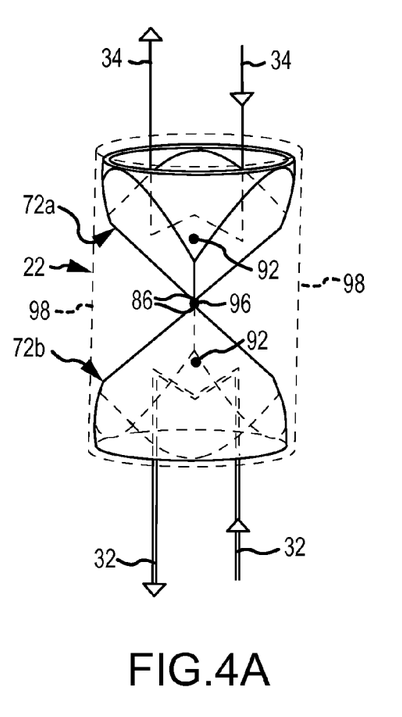
FIGS. 4A and 4B are perspective schematic views of the test masses of the type shown in FIGS. 1 and 3 which include retroreflectors shown in FIGS. 2A-2C.
Figure 4B:
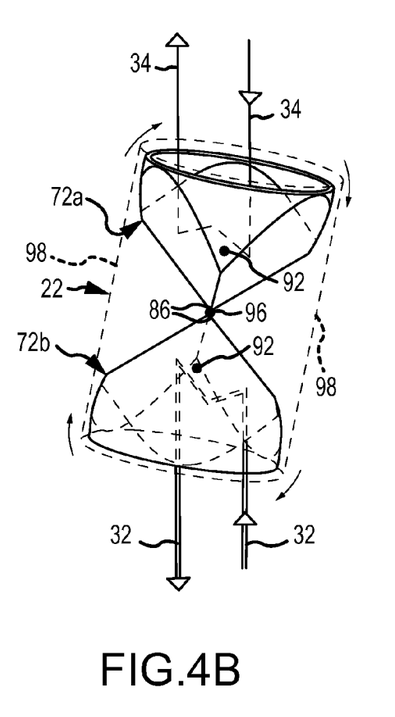

The above described properties of retroreflectors are used to advantage in constructing test masses which incorporate the present invention, as explained in conjunction with FIGS. 4A and 4B. The test mass 22 shown in FIGS. 4A and 4B exemplifies the characteristics of each test mass which incorporates the present invention. The retroreflectors 72a and 72b are positioned on the test mass 22 facing in opposite directions and parallel with one another. The corners 86 of the retroreflectors 72a and 72b are adjacent to but not necessarily touching each another. The optical center points 92 of the retroreflectors 72a and 72b are located equidistant from a center of mass point 96 of the test mass 22. The two optical center points 92 and the center of mass point 96 are located co-linearly. The corners 86 are also located coincident with the co-linear relationship of the two optical center points 92 and the center of mass 96. In this configuration, the distance from the center of mass point 96 to the optical center point 92 of the retroreflector 72a is equal to the distance from the center of mass point 96 to the optical center point 92 of the retroreflector 72b.

The test mass 22 has a physical support structure 98 which holds the two retroreflectors 72a and 72b in place. The physical support structure 98 of the test mass 22 and the two retroreflectors 72a and 72b is weighted to place the center of mass point 96 of the test mass 22 midway between the two optical center points 92. Such weighting or balancing may be achieved by moving, changing, removing or adding one or more adjustable weights (124, FIGS. 5 and 6) associated with the physical structure 98.

The support structure 98 also secures the two retroreflectors 72a and 72b so that their incident light beams 88 and their reflected light beams 90 (FIGS. 2A-2C) extend parallel with one another and are oriented in directly opposite directions from one another. In this arrangement, the reflected light beams extend directly opposite from one another.

When the test mass 22 rotates during freefall, it rotates about the center of mass point 96, as shown in FIG. 4B. Rotation about the center of mass point 96 causes the optical center points 92 of both retroreflectors 72a and 72b to rotate in the same amount and in the same rotational direction relative to the center of mass point 96, as shown in FIG. 4B. This similar rotation in the same rotational direction causes the parallel light beams which impinge on the retroreflectors 72a and 72b to be affected equally in their lengths. Consequently, rotation of the test mass 22 does not adversely affect the relative length of the beam arms 32 and 34, because such rotation has the same effect on the length of both beam arms 32 and 34.

If the test mass 22 could rotate about any point other than a point equidistant from the optical centers of the retroreflectors, i.e. at a point other than the center of mass point 96, then the lengths of the beam arms 32 and 34 will not be equal. However, when the test mass 22 is freefalling, it can rotate only about its center of mass point 96, so rotation of the test mass 22 about some point other than the center of mass point 96 is not possible during freefall.

If either one or both of the test masses 22 and 24 rotate during freefall, as shown in FIG. 3, the lengths of both beam arms 32 and 34 change by the same amount, since the rotation of one or both test masses changes the length of both beam arms 32 and 34 by the same amount. Consequently, the relative length relationship of the beam arms 32 and 34 is unaffected by rotation of the test masses during freefall. Since the lengths of the beam arms 32 and 34 change by the same amount when the test masses 22 and 24 rotate, common mode rejection of the adverse influences from rotation of the test masses 22 and 24 is achieved when the light beams from the beam arms are combined interferometrically. Rotation of the test masses 22 and 24 does not introduce noise or aberrant interference fringes within the output light beam 46. The accuracy of measurement is not adversely affected.

An example of the physical structure 98 (FIGS. 4A and 4B) which holds the retroreflectors in position with their optical center points 92 equidistant from the center of mass point 96, is a housing 100 which is described below in conjunction with FIGS. 5 and 6. This description is with reference to test mass 22, although the same description applies to each test mass which incorporates the present invention.

Figure 5:
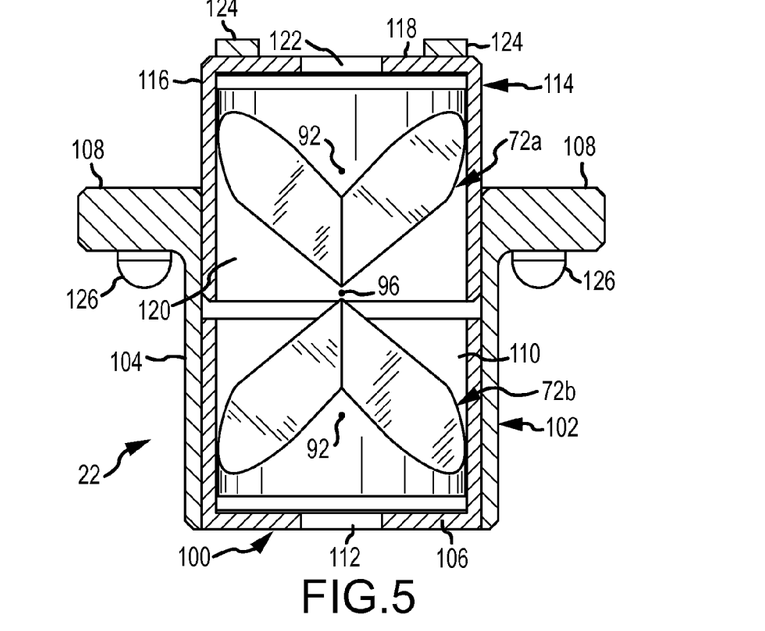
FIG. 5 is a longitudinal section view of one embodiment of the test mass shown schematically in FIGS. 4A and 4B.
Figure 6:
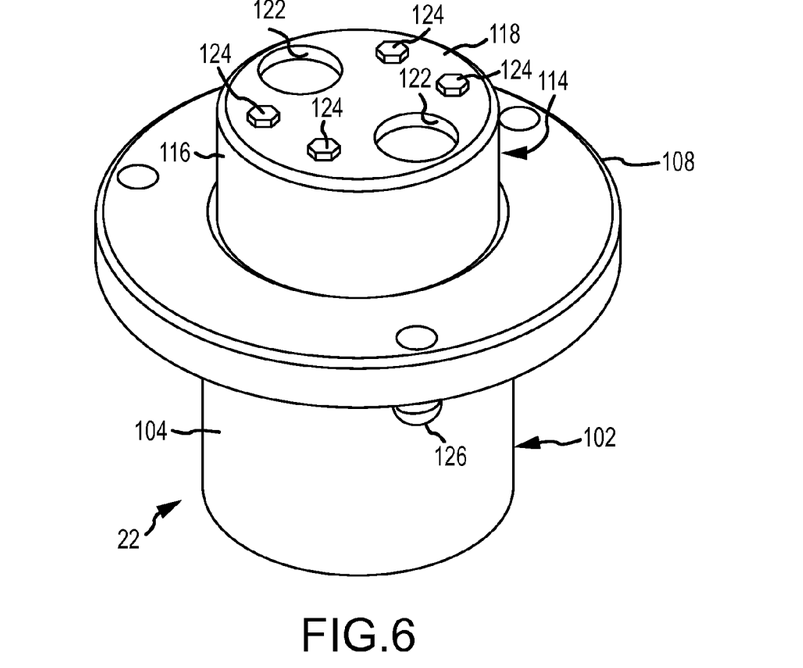
FIG. 6 is a perspective view of the test mass shown in FIG. 5.

As shown in FIGS. 5 and 6, a housing 100 of the test mass 22 includes a first cup portion 102 which is defined by a cylindrical side wall 104, a circular bottom wall 106 attached to the bottom (as shown) of the cylindrical side wall 104, and an annular flange 108 extending outward from the top (as shown) of the cylindrical side wall 104. The cylindrical side wall 104 and the circular bottom wall 106 define an interior 110 of the first cup portion 102. The retroreflector 72b is positioned within the interior 110 of the first cup portion 102 with the optical center point 92 of the retroreflector 72b facing downward relative to its corner and in the direction of the bottom wall 106. The retroreflector 72b is fixed in position in the interior 110 of the cup portion 102 using conventional retention devices and techniques. One or more light beam pass-through openings 112 are formed in the bottom wall 106 to allow the light beams to impinge upon and reflect from the retroreflector 72b.

The housing 100 of the test mass 22 also includes a second cup portion 114 which is defined by a cylindrical sidewall 116 and a circular top wall 118 formed on the top (as shown) of the cylindrical sidewall 116. The cylindrical sidewall 116 and the top wall 118 define an interior 120 of the second cup portion 114. The retroreflector 72a is fixed in position within the interior 120 of the second cup portion 114, with the the optical center point 92 of the retroreflector 72a facing upward relative to the corner and in the direction of the top wall 118. The retroreflector 72a is fixed in position within the second cup portion 114 using conventional retention devices and techniques. At least one light beam pass-through opening 122 is formed in the top wall 118 to allow the light beams to impinge upon and reflect from the retroreflector 72a.

The outside diameter of the cylindrical sidewall 116 is preferably slightly smaller than the inside diameter of the cylindrical sidewall 104 to allow the bottom portion (as shown) of cylindrical sidewall 116 of the second cup portion 114 to be partially inserted into the interior 110 of the cylindrical sidewall 104 of the first cup portion 102. Threads (not shown) are formed at locations on the sidewall portions 104 and 116 to screw together the two cup portions 104 and 116 as part of the housing 100.

The threaded engagement of the cylindrical side walls 104 and 116 also permits independent adjustment of the positions of the two cup portions 102 and 114 relative to one another to position the optical center points 92 of each retroreflector 72a and 72b equidistantly relative to the center of mass point 96 (FIGS. 4A and 5) of the test mass 22. Balancing weights 124 are attached to the top wall 118 of the second cup portion 114. The balancing weights 124 are adjustable in weight, number and position and are removable and replaceable with different weights to locate the center of mass point 96 of the test mass 22 midway between the optical center points 92 of the retroreflectors 72a and 72b, and to assure that the center of mass point 96 is also co-linear with the optical center points 92, as discussed in connection with FIGS. 4A and 4B.

The co-linear relationship of the optical center points 92 and the center of mass point 96 (FIGS. 4A and 5) is preferably perpendicular to the plane in which the flange 108 extends from the cylindrical sidewall 104 of the first cup portion 102. The test mass 22 is supported from the support device 31 of the elevator frame 30 (FIG. 1) by contact feet 126 which are connected to the flange 108. Rapid downward movement of the elevator frame 30 and the support device 31 by the elevator 29 (FIG. 1) separates the contact feet 126 from the support device 31 and releases the test mass 22 for freefall. Preferably the contact feet 126 support the test mass with the co-linear relationship of the optical center points 92 and the center of mass point 96 extending vertically. When the support device 31 (FIG. 1) withdraws to initiate freefall of the test mass 22, the perpendicular relationship of the co-linear points 92 and 96 with the support device 31 releases the test mass into freefall in an attempt to avoid rotating the test mass from the vertical orientation of the optical center points 92 and the center of mass point 96. Similarly, slowing the downward movement of the elevator frame 30 and the support device 31 by the elevator 29 (FIG. 1) reestablishes contact of the contact feet 126 with the support device 31 to catch the test mass 22 after it has freely fallen.

Figure 7:
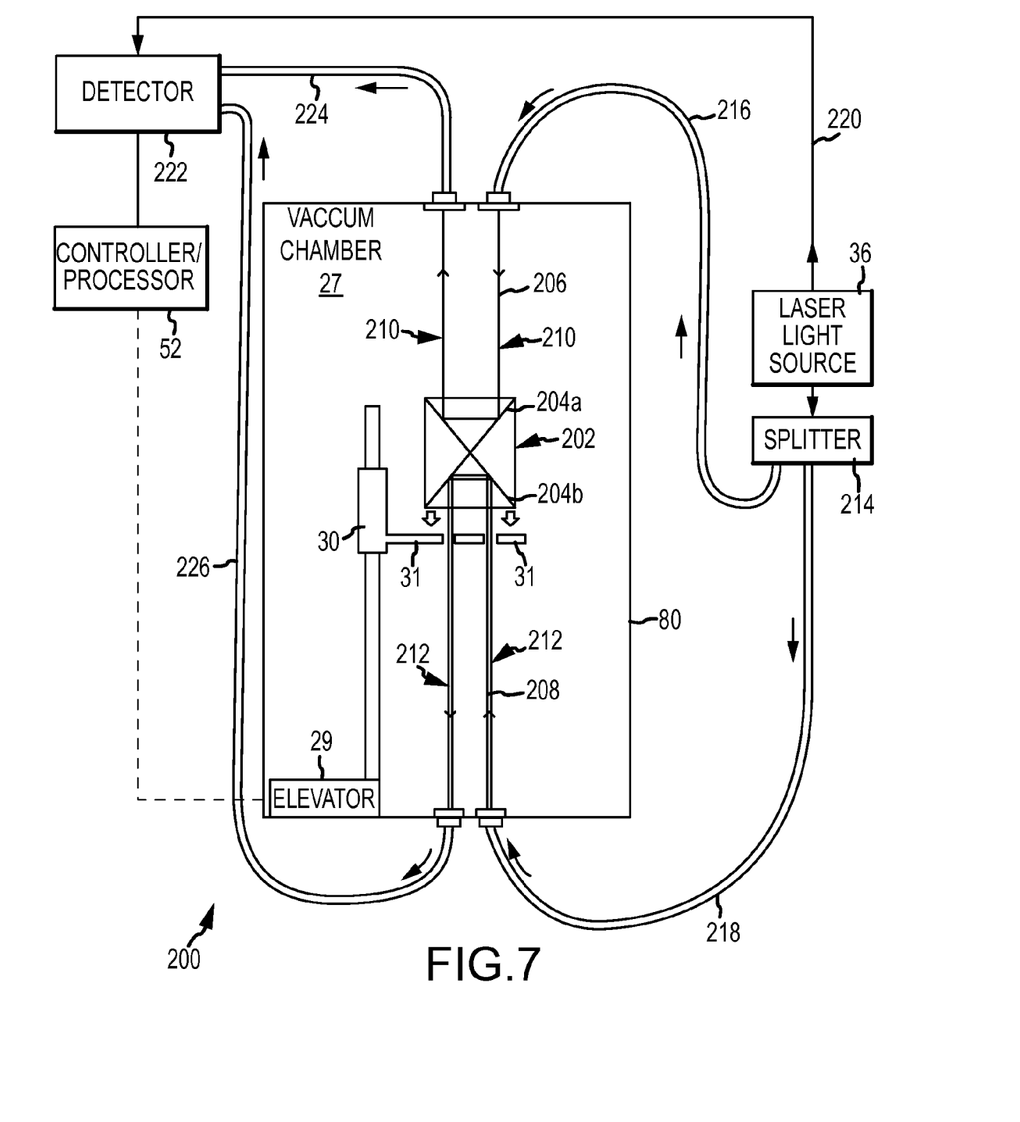
FIG. 7 is a generalized block, schematic and optical path diagram of a light beam interferometric gravimeter having a single test mass which incorporates the present invention.

The gravimeter 200, shown in FIG. 7, includes a test mass 202 which incorporates the present invention. The test mass 202 includes an upward facing retroreflector 204a and a downward facing retroreflector 204b. The retroreflectors 204a and 204b, and the test mass 202 as a whole, incorporate the features of the retroreflector 75 (FIGS. 2A-2C) and the test mass 22 (FIGS. 4A and 4B).

The gradiometer 200 is used to measure the value of gravity experienced by the test mass 202 when released to fall freely only under the influence of gravity. The influence of gravity on the test mass 202 causes it to accelerate downward during freefall. An elevator 29, an elevator frame 30 and a support device 31 support the test mass 202, release the test mass 202 to fall freely under the influence of gravity, and catch the test mass 202 at the end of its freefall.

Two light beams 206 and 208 impinge upon and reflect from the retroreflectors 204a and 204b, respectively. The light beams 206 and 208 traverse the interior of the vacuum chamber 27 of the gravimeter 200, over optical paths or beam arms 210 and 212, respectively. The beam arms cause the light beams 206 and 208 to impinge upon and reflect from the retroreflectors 204a and 204b, respectively. The effect of gravity on the test mass 202 during freefall changes the lengths of the beam arms 210 and 212. The length of the beam arm 210 increases, and the length of the beam arm 212 decreases, as the test mass 202 freefalls.

The light beams 206 and 208 which enter the beam arms 210 and 212 have essentially the same frequency characteristics, since the light beams 206 and 208 have been derived from a single constant-frequency laser light source 36. Light from the laser light source 36 is delivered to a splitter 214, and the splitter 214 creates the two light beams 206 and 208 which are identical to one another in frequency, and identical in frequency to the light beam supplied by the laser light source 36. The light beams 206 and 208 are conducted through optical fibers 216 and 218 to a housing 80 of the gravimeter 200, where the light beams 206 and 208 enter the beam arms 210 and 212, respectively. A reference light signal 220 is also supplied from the laser light source 36 to a detector 222. The reference light signal 220 has an identical frequency to the light beams 206 and 208.

When the light beams 206 and 208 in the beam arms 210 and 212 reflect from the retroreflectors 204a and 204b of the test mass 202 during freefall, the increasing physical length of the beam arm 210 and the decreasing physical length of the beam arm 212 create a changing phase relationship of the light beam reflected from the retroreflectors 204a and 204b, relative to the reference light signal 220 and relative to the other reflected light beam from the other beam arm. The reflected light beams 206 and 208, with their relatively varied phase relationship, are supplied through optical fibers 224 and 226 to the detector 222.

The reflected light beams 206 and 208 from the beam arms 210 and 212 are combined in the detector 222, each with reference to the reference light signal 220. The changed phase relationship of the reflected light beams 206 and 208 from the beam arms 210 and 212 creates interference fringes when the two reflected light beams 206 and 208 are combined together. These interference fringes characterize the acceleration of the test mass 202 during the freefall, and that acceleration correlates to a measurement of gravity.

The detector 222 generates signals which correspond to the characteristics of the combined light beams 206 and 208 including the interference fringes created by combining the light beams 206 and 208 from the beam arms 210 and 212. A controller/processor 52 responds to the signals from the detector 50 which represent the interference fringes to determine the value of gravity from those interference fringes, using known interferometric analysis and processing techniques.

Any rotation of the test mass 202 during its freefall results in equal changes in the length of the beam arms 210 and 212, for the reasons and in the manner previously described in conjunction with FIGS. 4A and 4B. Equal changes in the length of the beam arms 210 and 212 create equal effects in the light beams 206 and 208 from the beam arms, and these equal effects are canceled when the detector 222 combines the reflected light beams 206 and 208 from the beam arms 210 and 212, thereby leaving only the interference fringes resulting from the acceleration of the test mass as representing the quantity of gravity which is measured. In this manner, anomalous influences from rotation or tilting of the test mass 202 during freefall are canceled by common mode rejection, and these anomalous influences resulting from rotation or tilting of the test mass do not adversely influence the value of gravity measured. The value of the gravity measurement is derived from the interference fringes resulting only from the acceleration of the freefalling test mass, thereby enhancing the ability to detect small values of gravity free of the influence of rotation or tilting of the test mass.

As has been discussed above, each test mass of the present invention ameliorates or eliminates inaccuracies in gravity measurements caused by rotation or tilting of the test mass during freefall. The co-linearly and equally spaced optical center points 92 of the retroreflectors relative to the center of mass of the test mass cause the oppositely reflected light beams to change lengths by equal amounts when the test mass rotates or tilts, thereby preserving the relative equality in length of the light beam paths and canceling the effects of rotation or tilting by common mode rejection of changes in path length when the two reflected light beams are combined to measure the gravity characteristic. The cancellation of the effects caused by rotation of the test mass occurs when the phase of the light beam that reflects from one retroreflector of the test mass is compared to the phase of a different beam that reflects from the opposite retroreflector of the test mass. In the gravimeter 200 (FIG. 1), the cancellation occurs when the two light beams are combined. In the gradiometer 20 (FIG. 1), the cancellation occurs because each light beam reflects off of different retroreflectors of each of the two falling test masses. When these beams are combined, rotation errors from each test mass are canceled at the same time.

Preserving the same length in the light beam paths avoids creating anomalous and distorted interference fringes which would otherwise contribute to inaccuracy in the gravity characteristic measurement. The dynamic range of accurate measurement of gravity in a gravimeter and the dynamic range of accurate measurement of gravity gradients in a gradiometer is significantly enhanced.

Many other advantages and improvements will become apparent upon fully appreciating the many aspects of the present invention. Presently preferred embodiments of the present invention and many of its improvements have been described with a degree of particularity. This description is of preferred examples of implementing the invention, and this description is not necessarily intended to limit the scope of the invention. The scope of the invention is defined by the scope of the following claims.

What is claimed:

1. A test mass having a center of mass point and which is adapted to freefall under the influence of gravity in an interferometric light beam gravity characteristic measurement apparatus, comprising:
a first retroreflector having an optical center point and operative to reflect a first incident light beam as a first reflected light beam;
a second retroreflector having an optical center point and operative to reflect a second incident light beam as a second reflected light beam; and wherein:
the first and second retroreflectors are retained on the test mass with their respective optical center points each separated at a finite equal distance from the center of mass point, with the optical center points and the center of mass point all co-linear with one another, with the center of mass point located between the optical center points, and with the first and second retroreflectors oriented to reflect the first and second reflected light beams parallel to one another and in opposite directions from one another.

2. A test mass as defined in claim 1, wherein:
the first retroreflector reflects the first reflected light beam parallel to the first incident light beam; and
the second retroreflector reflects the second reflected light beam parallel to the second incident light beam.

3. A test mass as defined in claim 1, further comprising:
a support structure which retains the first and second retroreflectors to the test mass in predetermined positions relative to each other; and
a weight moveably attached to the support structure to adjust the position of the center of mass point of the test mass with respect to the optical center points of the first and second retroreflectors.

4. A test mass as defined in claim 1, further comprising:
a first housing element which retains the first retroreflector to the test mass in a predetermined position relative to the first housing element;
a second housing element which retains the second retroreflector to the test mass in a predetermined position relative to the second housing element; and wherein:
the first and second housing elements are moveable relative to each other to position the optical center points of the first and second retroreflectors relative to the center of mass point.

5. A test mass as defined in claim 1, further comprising:
a first housing element which retains the first retroreflector to the test mass in a predetermined position;
a second housing element which retains the second retroreflector to the test mass in a predetermined position; and wherein:
the first and second housing elements surround the first and second retroreflectors, respectively;
the first housing element defines pass-through openings to allow the first incident and reflected light beams to impinge upon and reflect from the first retroreflector; and
the second housing element defines pass-through openings to allow the second incident and reflected light beams to impinge upon and reflect from the second retroreflector.

6. A test mass as defined in claim 1 wherein:
the first and second retroreflectors are open.

7. A test mass as defined in claim 1, wherein:
each of the first and second retroreflectors is defined by three mutually perpendicular reflective wall surfaces which intersect at a corner; and the corners of the first and second retroreflectors are each positioned coincidently with the co-linear relationship of the optical center points and the center of mass point.

8. A test mass as defined in claim 7, wherein the interferometric light beam gravity characteristic measurement apparatus is a gravimeter.

9. A test mass as defined in claim 1, wherein the interferometric light beam gravity characteristic measurement apparatus is a gradiometer.

10. A test mass as defined in claim 9, wherein the gradiometer comprises two of said test masses which are vertically separated by a distance and which freefall simultaneously to measure a gradient of gravity over the distance between the two test masses.

11. A method of using the test mass defined in claim 1 in an interferometric light beam gravity characteristic measuring apparatus, comprising:
freefalling the test mass;
rotating the test mass while freefalling;
directing a first light beam into a first beam arm which has a length, the first light beam in the first beam arm impinging upon and reflecting from the first retroreflector while the test mass is freefalling;
directing a second light beam into a second beam arm which has a length, the second light beam in the second beam arm impinging upon and reflecting from the second retroreflector while the test mass is freefalling;
changing the lengths of the first and second beam arms by an amount related to the freefall movement of the test mass;
changing the lengths of the first and second beam arms by an amount related to rotation of the test mass during the freefall movement;
combining the first and second reflected light beams into a combined light beam to create interference fringes in the combined light beam;
canceling interference fringes in the combined light beam arising from the first and second reflected light beams caused by rotation of the test mass during the freefall movement; and
determining the gravity characteristic from the interference fringes of the combined light beam after cancellation of the interference fringes caused by rotation of the test mass during the freefall movement.

12. A method of using the test mass defined in claim 2 in an interferometric light beam gravity characteristic measuring apparatus, comprising:
freefalling the test mass;
rotating the test mass while freefalling;
directing a first light beam into a first beam arm which has a length, the first light beam in the first beam arm impinging upon and reflecting from the first retroreflector while the test mass is freefalling;
directing a second light beam into a second beam arm which has a length, the second light beam in the second beam arm impinging upon and reflecting from the second retroreflector while the test mass is freefalling;
changing the lengths of the first and second beam arms by an amount related to the freefall movement of the test mass;
changing the lengths of the first and second beam arms by an amount related to rotation of the test mass during the freefall movement;
combining the first and second reflected light beams into a combined light beam to create interference fringes in the combined light beam;
canceling interference fringes in the combined light beam arising from the first and second reflected light beams caused by rotation of the test mass during the freefall movement; and
determining the gravity characteristic from the interference fringes of the combined light beam after cancellation of the interference fringes caused by rotation of the test mass during the freefall movement.

13. A method of eliminating adverse effects of rotation of a freely falling test mass which has a center of mass point when measuring a gravity characteristic by light beam interferometry, comprising:
freefalling the test mass;
rotating the test mass during freefall;
respectively reflecting first and second light beams from first and second retroreflectors of the test mass during freefall, each first and second retroreflector having an optical center point, the respective optical center points of each first and second retroreflector are each spaced at a finite equal distance from the center of mass point, the optical center points and the center of mass point are located co-linearly, the center of mass point is located between the optical center points, and the first and second retroreflectors are oriented to reflect the first and second light beams parallel to one another and in opposite directions from one another;
combining the first and second reflected light beams interferometrically to create fringes which characterize the gravity characteristic to be measured;
eliminating aberrant fringes from the combined first and second reflected light beams resulting from the rotation of the test mass during freefall; and
determining the measured gravity characteristic from the fringes of the combined first and second light reflected beams after eliminating the aberrant fringes.

14. A method as defined in claim 13, wherein eliminating the aberrant fringes further comprises:
impinging and reflecting the first and second light beams on the first and second retroreflectors in separate paths which each have a length;
reflecting the first and second light beams from the first and second retroreflectors attached to the test mass during rotation of the test mass during freefall; and
changing the path length of each first and second light beam equally when impinging on and reflecting from the first and second retroreflectors during rotation of the test mass during freefall.

15. A method as defined in claim 14, further comprising:
rotating the test mass about the center of mass point during freefall.

16. A method as defined in claim 15, further comprising:
reflecting the first light beam from the first retroreflector parallel to the impingement of the first light beam on the first retroreflector during rotation of the test mass during freefall; and
reflecting the second light beam from the second retroreflector parallel to the impingement of the second light beam on the second retroreflector during rotation of the test mass during freefall.

17. A method of using the two test masses in the gradiometer as defined in claim 10, wherein the two test masses are designated as a first test mass and a second test mass, respectively, and wherein the method comprises:
freefalling the first and second test masses simultaneously;
rotating at least one of the first and second test masses while both of the test masses are freefalling simultaneously;

directing a first light beam into a first beam arm having a length, the first light beam in the first beam arm impinging upon and reflecting from a first retroreflector of the first test mass and a second retroreflector of the second test mass while both of the test masses are freefalling;

directing a second light beam into a second beam arm having a length, the second light beam in the second beam arm impinging upon and reflecting from a second retroreflector of the first test mass and a first retroreflector of the second test mass while both of the test masses are freefalling;

changing the lengths of the first and second beam arms by an amount related to any relative change in distance separating the first and second test masses during simultaneous freefall of both of the test masses;

changing the lengths of the first and second beam arms by an equal amount related to the rotation of the one test mass during simultaneous freefall;

combining the first and second reflected light beams into a combined light beam to create interference fringes in the combined light beam;

canceling interference fringes in the combined light beam arising from the first and second reflected light beams caused by rotation of the one test mass during simultaneous freefall; and determining the gravity characteristic from the interference fringes of the combined light beam after cancellation of the interference fringes caused by rotation of the one test mass.

* * * * *